United States Patent
Kim

(10) Patent No.: US 7,080,875 B2
(45) Date of Patent: Jul. 25, 2006

(54) VEHICLE FLOOR CAPABLE OF DISTRIBUTING IMPACT LOAD AT COLLISION

(75) Inventor: Ki Chang Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/024,836

(22) Filed: Dec. 28, 2004

(65) Prior Publication Data
US 2006/0071508 A1    Apr. 6, 2006

(30) Foreign Application Priority Data
Oct. 5, 2004   (KR) .................. 10-2004-0079096

(51) Int. Cl.
   *B62D 21/00* (2006.01)
(52) U.S. Cl. ................................ 296/187.09
(58) Field of Classification Search ........... 296/187.09, 296/187.01, 187.03, 187.08, 187.1, 203.01, 296/204, 203.02, 29, 209; 180/311
See application file for complete search history.

(56) References Cited

U.S. PATENT DOCUMENTS

| | | | | |
|---|---|---|---|---|
| 4,669,776 A * | 6/1987 | Harasaki | ................. | 296/203.02 |
| 5,011,201 A * | 4/1991 | Takahashi et al. | ..... | 296/203.02 |
| 5,042,872 A * | 8/1991 | Yoshii | ................. | 296/203.02 |
| 5,112,102 A * | 5/1992 | Wurl | .................................. | 296/204 |
| 5,125,715 A * | 6/1992 | Kijima | ................. | 296/187.09 |
| 5,184,868 A * | 2/1993 | Nishiyama | ............. | 296/187.09 |
| 5,480,208 A * | 1/1996 | Cobes et al. | ........... | 296/203.01 |
| 5,806,918 A * | 9/1998 | Kanazawa | .................. | 296/204 |
| 5,882,065 A * | 3/1999 | Koiwa et al. | .......... | 296/203.02 |
| 6,145,923 A * | 11/2000 | Masuda | ................... | 296/1.03 |
| 6,209,950 B1 * | 4/2001 | Hanyu | ................... | 296/203.02 |
| 6,447,052 B1 * | 9/2002 | Saeki | .................... | 296/187.09 |
| 6,592,175 B1 * | 7/2003 | Shibata | ................ | 296/203.02 |
| 6,908,146 B1 * | 6/2005 | Tomita | ................. | 296/203.02 |
| 6,916,063 B1 * | 7/2005 | Song | ................... | 296/203.02 |
| 6,929,314 B1 * | 8/2005 | Hanyu | ................... | 296/203.02 |
| 6,938,950 B1 * | 9/2005 | Nagafuchi et al. | ..... | 296/203.02 |
| 2002/0074830 A1 * | 6/2002 | Takemoto | .............. | 296/203.02 |
| 2002/0149234 A1 * | 10/2002 | Cheong | ................ | 296/203.04 |
| 2004/0145216 A1 * | 7/2004 | Kuroda et al. | ......... | 296/203.02 |
| 2004/0145217 A1 * | 7/2004 | Hanyu | ........................ | 296/204 |
| 2004/0256890 A1 * | 12/2004 | Nagafuchi et al. | ..... | 296/203.02 |

(Continued)

FOREIGN PATENT DOCUMENTS

JP                05162661    *  6/1993  ................ 296/204

*Primary Examiner*—H Gutman
(74) *Attorney, Agent, or Firm*—Morgan Lewis & Bockius LLP

(57) ABSTRACT

A vehicle floor capable of distributing an impact load imparted to the floor at the time of head-on vehicle collisions, at the lower floor sides of a vehicle body frame; the body frame including a side outer panel, an outer reinforcing member, a side inner panel, a side chamber inner panel, a cowl side lower member, a front side outer member, a front side inner member, a front side rear lower member, a front side rear upper member, a front side inner reinforcing member, a frame mounting rear reinforcing member, and a center floor side member. A floor outer member, which enables a box type connection, is provided at the rear end of the front side outer member and the side chamber inner panel. Box-protruding structures for a front reinforcing member and a front member are formed in between the floor outer member and the side chamber inner panel.

5 Claims, 4 Drawing Sheets

U.S. PATENT DOCUMENTS

2005/0046237 A1* 3/2005 Miyoshi et al. ........ 296/203.02

2005/0264042 A1* 12/2005 Abe et al. .............. 296/203.01

* cited by examiner

VEHICLE FLOOR CAPABLE OF DISTRIBUTING IMPACT LOAD AT COLLISION

CROSS REFERENCE TO RELATED APPLICATION

This application is based on, and claims priority to Korean Patent Application No. 2004-79096, filed on Oct. 5, 2004, the disclosure of which is hereby incorporated by reference.

TECHNICAL FIELD OF THE INVENTION

The present invention generally relates to a vehicle. More particularly, the floor has a structure capable of distributing an impact load imparted to the floor at the time of a head-on vehicle collision, thereby, greatly reducing the level of injuries to the legs of the driver.

BACKGROUND OF THE INVENTION

The percentage of leg injuries caused by head-on vehicle collisions is increasing and Underwriters Laboratories Inc. of the U.S. and Euro NCAP expect that a direct eccentric impact will increase the level of leg injuries. The impact-distributing structure of a vehicle floor is connected only in a fore-aft direction between a front side member and a center floor side member. This is because the conventional rear-wheel drive vehicle cannot have members at the lower part of the tunnel. Therefore, the connection of the impact-distributing structure with the side chamber box of the vehicle via a dash panel is compromised and, thus, experiences an enormous amount of change in vehicle body at the time of a head-on collision. As a result, the number and level of leg injuries to drivers is severe.

SUMMARY OF THE INVENTION

According to an embodiment of the present invention, a vehicle floor is provided with a structure capable of distributing impact-loads imparted at the time of a head-on collision. A floor outer member of a box type is established that can be connected between a front side outer member and a front end of a side chamber. Thereby, significantly reducing the level of leg injuries of drivers involved in head-on vehicle collisions.

BRIEF DESCRIPTION OF THE DRAWINGS

The aforementioned aspect and other features of the present invention will be explained in the following detailed description, taken in conjunction with the accompanying drawings, wherein.

DETAILED DESCRIPTION OF THE INVENTION

Figure 1:
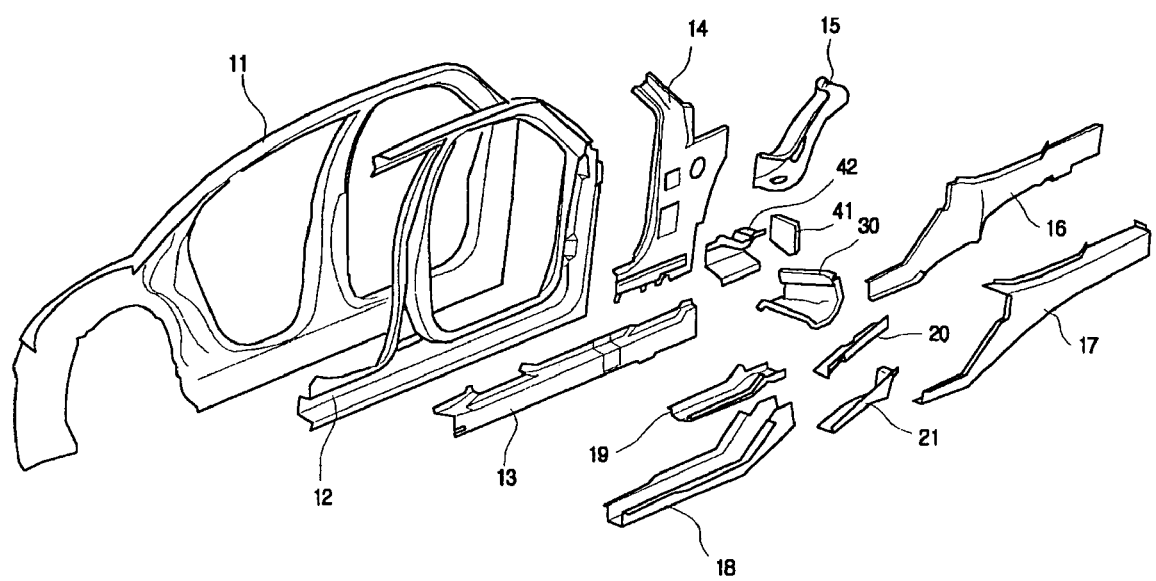
FIG. 1 is an elevated view of a vehicle floor showing distribution of an impact load being imparted in the event of a head-on collision at a lower part of the vehicle floor according to an embodiment of the present invention.
Figure 2:
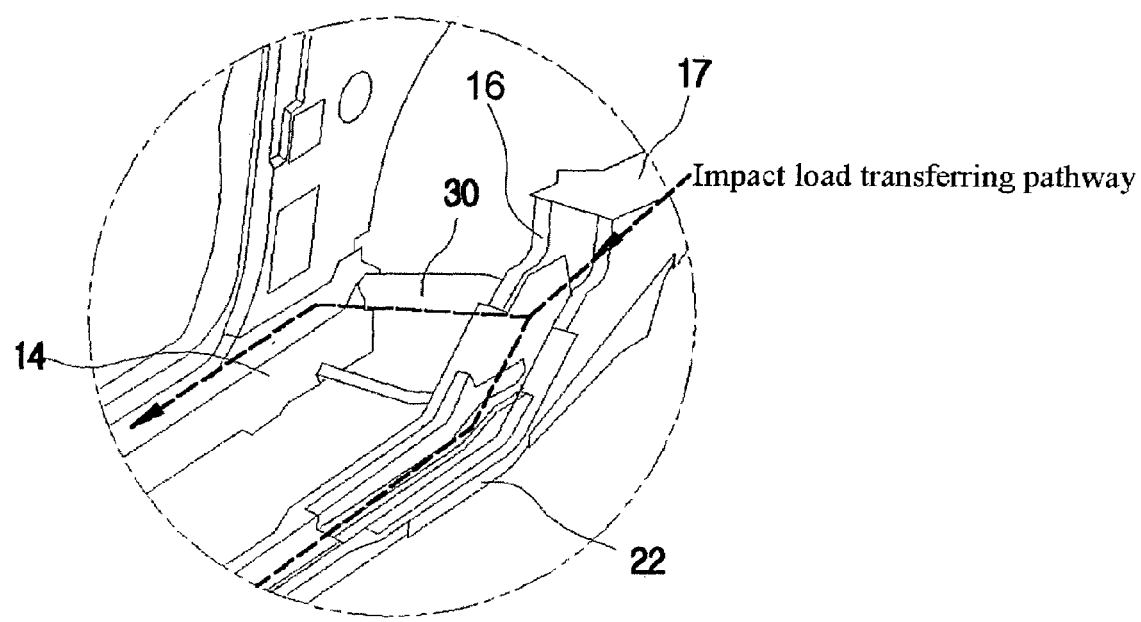
FIG. 2 is a partial perspective view of a vehicle floor showing distribution of an impact load being imparted in the event of a head-on collision at a lower part of the vehicle floor according to an embodiment of the present invention.
Figure 3:
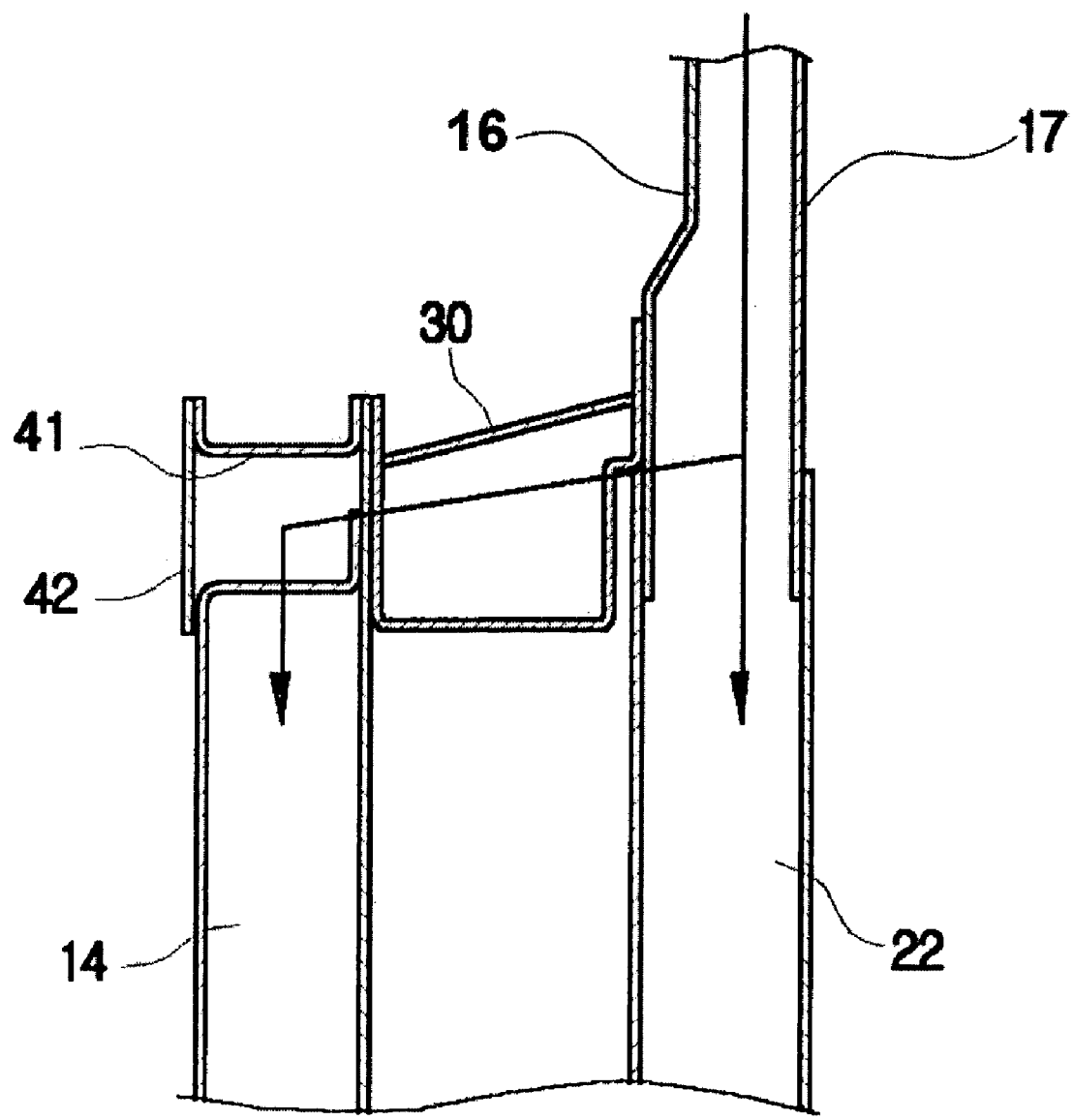
FIG. 3 is a cross-sectional view of a joined state of a vehicle floor showing distribution of an impact load being imparted in the event of a head-on collision at a lower part of the vehicle floor according to an embodiment of the present invention.
Figure 4:
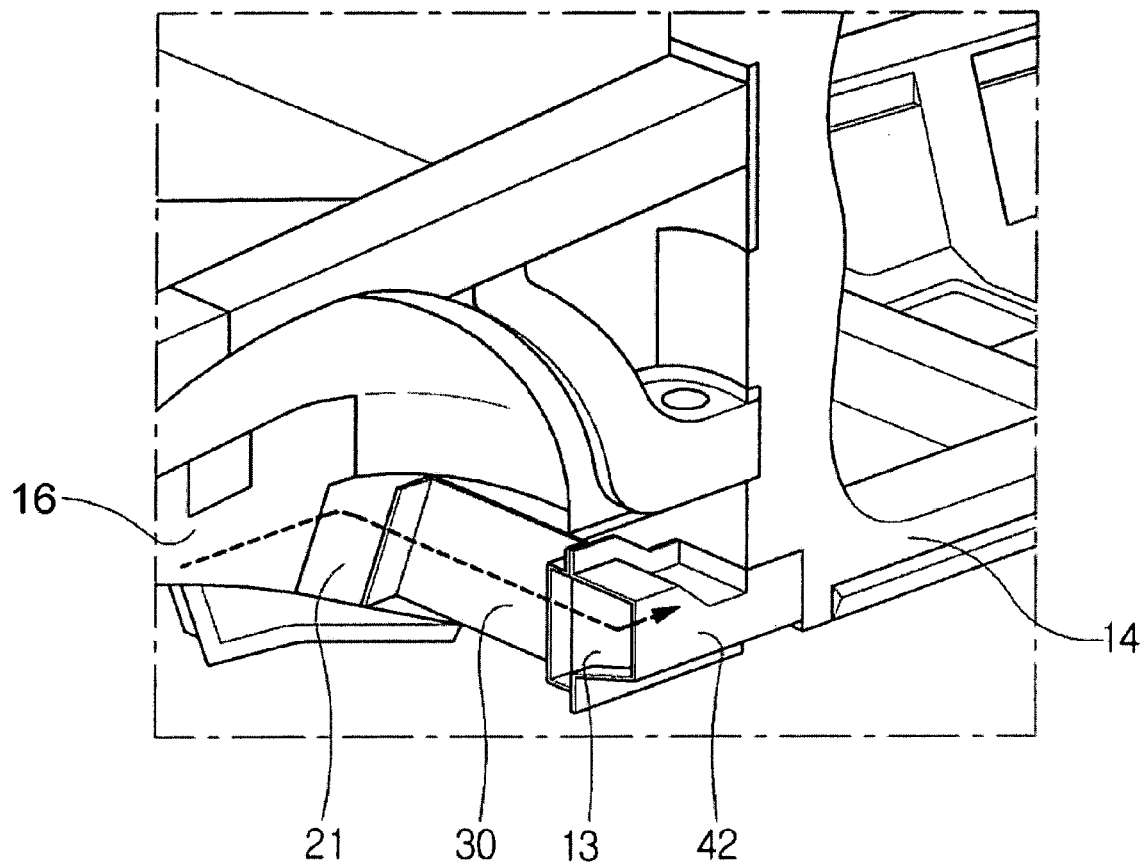
FIG. 4 is a combined perspective view of a vehicle floor showing distribution of an impact load being imparted in the event of a head-on collision at a lower part of the vehicle floor according to an embodiment of the present invention.

According to an embodiment, as shown in FIGS. 1–4, the present invention provides a vehicle floor having a structure capable of distributing impact load being imparted in the event of a head-on vehicle collision at the lower floor sides of a vehicle body frame. The body frame is formed by assembly of members comprising a side outer panel 11, an outer reinforcing member 12, a side inner panel 13, a side chamber inner panel 14, a cowl side lower member 15, a front side outer member 16, a front side inner member 17, a front side rear lower member 18, a front side rear upper member 19, a front side inner reinforcing member 20, a frame mounting rear reinforcing member 21, and a center floor side member 22.

According to another embodiment, the present invention provides a vehicle floor having a structure capable of distributing impact load being imparted in the event of a head-on vehicle collision at the lower floor sides of a vehicle body frame. A floor outer member 30, which enables a box type connection, is provided at the rear end of the front side outer member 16 and the front end of the side chamber inner panel 14 for distributing the impact load.

According to yet another embodiment, the present invention provides a vehicle floor having a structure capable of distributing impact load being imparted in the event of a head-on vehicle collision at the lower floor sides of a vehicle body frame. Box-protruding structures for the front reinforcing member 41 and the front member 42 are formed in between the floor outer member 30 and the side chamber inner panel 14 for transferring the impact load being imparted to the floor outer member 30 into the center floor side member 22.

After the side outer panel 11 is connected to the outer reinforcing member 12, the following members are connected to the outer reinforcing member 12 in the following order: the side inner panel 13; the side chamber inner panel 14; the cowl side lower member 15; the front side outer member 16; the front side inner member 17; the front side rear lower member 18; the front side rear upper member 19; the front side inner reinforcing member 20; the frame mounting rear reinforcing member 21; and the center floor side member 22.

The front reinforcing member 41 and the front member 42 in the form of box-protruding structures are provided at the front side of the front side outer member 16 and the side chamber inner panel 14 in between the floor outer member 30 and the side chamber inner panel 14 after the floor outer member 30 is connected. The above structure provides a reduction to the level of leg injuries of drivers involved in car accidents by distributing the impact load imparted form the car accident to the center floor side member 22, in the direction of the arrows in FIGS. 2–4, via the front reinforcing member 41 and the front member 42, both of which have box-protruding structures, while minimizing the change in a vehicle body resulted from a head-on car collision.

Even though the present invention is described in detail with reference to the foregoing embodiments, it is not intended to limit the scope of the present invention thereto. It will be evident from the foregoing that many variations and modifications may be made by a person having an ordinary skill in the present field without departing from the essential concept and scope of the present invention defined by the appended claims.

What is claimed is:

1. A vehicle floor structure capable of distributing an impact load being imparted in the event of a head-on vehicle collision at lower floor sides of a vehicle body frame, the body frame formed by assembly of members comprising:
   a side outer panel coupled to an outer reinforcing member;
   a side inner panel coupled to the outer reinforcing member;
   a side chamber inner panel coupled to the outer reinforcing member;
   a cowl side lower member coupled to the outer reinforcing member;
   a front side outer member coupled to the outer reinforcing member;
   a front side inner member coupled to the outer reinforcing member;
   a front side rear lower member coupled to the outer reinforcing member;
   a front side rear upper member coupled to the outer reinforcing member;
   a front side inner reinforcing member coupled to the outer reinforcing member;
   a frame mounting rear reinforcing member coupled to the outer reinforcing member; and
   a center floor side member coupled to the outer reinforcing member.

2. The vehicle floor structure according to claim 1, wherein a floor outer member, which enables a box connection, is provided at a rear end of said front side outer member and said side chamber inner panel.

3. The vehicle floor structure according to claim 2, further comprising a front reinforcing member and said a front member in between said floor outer member and said side chamber inner panel.

4. A vehicle body frame floor structure, comprising:
   a side outer panel coupled to an outer reinforcing member;
   a side inner panel coupled to a lower portion of the outer reinforcing member;
   a side chamber inner panel coupled to the side inner panel and the outer reinforcing member;
   a cowl side lower member coupled to the side chamber inner panel and the outer reinforcing member;
   a front side outer member coupled to the outer reinforcing member;
   a front side inner member coupled to the front side outer member and the outer reinforcing member;
   a front side rear lower member coupled to the outer reinforcing member;
   a front side rear upper member coupled to the outer reinforcing member;
   a front side inner reinforcing member coupled to the outer reinforcing member;
   a frame mounting rear reinforcing member coupled to the outer reinforcing member; and
   a center floor side member coupled to the outer reinforcing member.

5. A vehicle body frame floor structure, comprising:
   a side outer panel coupled to an outer reinforcing member;
   a side inner panel coupled to the side outer panel;
   a side chamber inner panel coupled to the side inner panel;
   a cowl side lower member coupled to the side chamber inner panel;
   a front side outer member coupled to the cowl side lower member;
   a front side inner member coupled to the front side outer member;
   a front side rear lower member coupled to the front side inner member;
   a front side rear upper member coupled to front side rear lower member;
   a front side inner reinforcing member coupled to the front side rear upper member;
   a frame mounting rear reinforcing member coupled to the front side inner reinforcing member; and
   a center floor side member coupled to the frame mounting rear reinforcing member.

* * * * *